(12) United States Patent
Dewan et al.

(10) Patent No.: US 12,056,253 B2
(45) Date of Patent: Aug. 6, 2024

(54) INTERCONNECTION OF PROTECTED INFORMATION BETWEEN COMPONENTS

(71) Applicant: Infineon Technologies AG, Neubiberg (DE)

(72) Inventors: Ketan Dewan, Unterhaching (DE); Trevor Bird, Somerset (GB); Simon Cottam, Bristol (GB); Glenn Ashley Farrall, Long Ashton (GB); Darren Galpin, Bristol (GB); Frank Hellwig, Wunstorf (DE); Paul Hubbert, Bristol (GB); Dietmar Koenig, Munich (DE); Shubhendu Mahajan, Munich (DE); Sandeep Vangipuram, Bristol (GB)

(73) Assignee: Infineon Technologies AG, Neubiberg (DE)

( * ) Notice: Subject to any disclaimer, the term of this patent is extended or adjusted under 35 U.S.C. 154(b) by 462 days.

(21) Appl. No.: 17/340,761

(22) Filed: Jun. 7, 2021

(65) Prior Publication Data
US 2022/0391524 A1    Dec. 8, 2022

(51) Int. Cl.
*G06F 21/62* (2013.01)
*G06F 21/85* (2013.01)
*H03M 13/09* (2006.01)

(52) U.S. Cl.
CPC .......... *G06F 21/6218* (2013.01); *G06F 21/85* (2013.01); *H03M 13/09* (2013.01)

(58) Field of Classification Search
CPC .. G06F 21/6218; G06F 21/85; G06F 11/1004; G06F 11/10; H03M 13/09; H03M 13/05
See application file for complete search history.

(56) References Cited

U.S. PATENT DOCUMENTS

| | | | |
|---|---|---|---|
| 2008/0184088 A1* | 7/2008 | Yang | H04L 1/08 714/755 |
| 2016/0048423 A1* | 2/2016 | Williams | G06F 11/1004 714/819 |
| 2021/0089418 A1* | 3/2021 | Das Sharma | G06F 11/2247 |

FOREIGN PATENT DOCUMENTS

CN    116501536 A  *  7/2023

OTHER PUBLICATIONS

Steven Iveson, "IP Fragmentation in Detail", Nov. 26, 2019, https://packetpushers.net/ip-fragmentation-in-detail/, 13 pages (Year: 2019).*
Stephen St. Michael, "Introduction to the Advanced Extensible Interface (AXI)", Oct. 17, 2019, https://www.allaboutcircuits.com/technical-articles/introduction-to-the-advanced-extensible-interface-axi/, 7 pages (Year: 2019).*
Arm, "Learn the architecture—An introduction to AMBA AXI", Aug. 25, 2020, https://developer.arm.com/documentation/102202/0300, 62 pages (Year: 2020).*

* cited by examiner

*Primary Examiner* — Han Yang
(74) *Attorney, Agent, or Firm* — Banner & Witcoff Ltd.

(57) ABSTRACT

An interconnect including an input couplable to a source, and an encoder coupled to the input. The encoder is configured to: group information that is received from the source via a same channel; size the grouped information to a common width; and apply protection to the sized grouped information.

20 Claims, 9 Drawing Sheets

---

600
Method of Interconnecting Information between a Source and Destination

610
Grouping information that is received at an interconnect input from the source via a same channel.

↓

620
Sizing the grouped information to a common width.

↓

630
Applying protection to the sized grouped information using an encoder coupled to the interconnect input.

500
Interconnect durint read operation

FIG 7A

700A
Table of
Write Address Channel Signals

Table A2-2 Write address channel signals

| Signal | Source | Description |
|---|---|---|
| AWID | Master | Identification tag for a write transaction. See *ID signals* on page A3-81. |
| AWADDR | Master | The address of the first transfer in a write transaction. See *Address structure* on page A3-48. |
| AWLEN | Master | Length, the exact number of data transfers in a write transaction. This information determines the number of data transfers associated with the address. This changes between AXI3 and AXI4. See *Burst length* on page A3-48. |
| AWSIZE | Master | Size, the number of bytes in each data transfer in a write transaction. See *Burst size* on page A3-49. |
| AWBURST | Master | Burst type, indicates how address changes between each transfer in a write transaction. See *Burst type* on page A3-49. |
| AWLOCK | Master | Provides information about the atomic characteristics of a write transaction. This changes between AXI3 and AXI4. See *Locked accesses* on page A7-99. |
| AWCACHE | Master | Indicates how a write transaction is required to progress through a system. See *Memory types* on page A4-69. |
| AWPROT | Master | Protection attributes of a write transaction: privilege, security level, and access type. See *Access permissions* on page A4-73. |
| AWQOS | Master | Quality of Service identifier for a write transaction. Not implemented in AXI3. See *QoS signaling* on page A8-103. |
| AWREGION | Master | Region indicator for a write transaction. Not implemented in AXI3. See *Multiple region signaling* on page A8-103. |
| AWUSER | Master | User-defined extension for the write address channel. Not implemented in AXI3. See *User-defined signaling* on page A8-104. |
| AWVALID | Master | Indicates that the write address channel signals are valid. See *Channel handshake signals* on page A3-42. |
| AWREADY | Slave | Indicates that a transfer on the write address channel can be accepted. See *Channel handshake signals* on page A3-42. |

FIG 7B

**700B
Table of
Write Data Channel Signals**

Table A2-3 Write data channel signals

| Signal | Source | Description |
|---|---|---|
| WID | Master | The ID tag of the write data transfer. Implemented in AXI3 only. See *ID signals* on page A3-81. |
| WDATA | Master | Write data. See *Write data channel* on page A3-43. |
| WSTRB | Master | Write strobes, indicate which byte lanes hold valid data. See *Write strobes* on page A3-54. |
| WLAST | Master | Indicates whether this is the last data transfer in a write transaction. See *Write data channel* on page A3-43. |
| WUSER | Master | User-defined extension for the write data channel. Not implemented in AXI3. See *User-defined signaling* on page A8-104. |
| WVALID | Master | Indicates that the write data channel signals are valid. See *Channel handshake signals* on page A3-42. |
| WREADY | Slave | Indicates that a transfer on the write data channel can be accepted. See *Channel handshake signals* on page A3-42. |

FIG 7C

**700C
Table of
Write Response Channel Signals**

Table A2-4 Write response channel signals

| Signal | Source | Description |
|---|---|---|
| BID | Slave | Identification tag for a write response. See *ID signals* on page A3-81. |
| BRESP | Slave | Write response, indicates the status of a write transaction. See *Read and write response structure* on page A3-59. |
| BUSER | Slave | User-defined extension for the write response channel. Not implemented in AXI3. See *User-defined signaling* on page A8-104. |
| BVALID | Slave | Indicates that the write response channel signals are valid. See *Channel handshake signals* on page A3-42. |
| BREADY | Master | Indicates that a transfer on the write response channel can be accepted. See *Channel handshake signals* on page A3-42. |

FIG 7D

700D
Table of
Read Address Channel Signals

Table A2-5 Read address channel signals

| Signal | Source | Description |
|---|---|---|
| ARID | Master | Identification tag for a read transaction. See *ID signals* on page A5-81. |
| ARADDR | Master | The address of the first transfer in a read transaction. See *Address structure* on page A3-48. |
| ARLEN | Master | Length, the exact number of data transfers in a read transaction. This changes between AXI3 and AXI4. See *Burst length* on page A3-48. |
| ARSIZE | Master | Size, the number of bytes in each data transfer in a read transaction. See *Burst size* on page A3-49. |
| ARBURST | Master | Burst type, indicates how address changes between each transfer in a read transaction. See *Burst type* on page A3-49. |
| ARLOCK | Master | Provides information about the atomic characteristics of a read transaction. This changes between AXI3 and AXI4. See *Locked accesses* on page A7-99. |
| ARCACHE | Master | Indicates how a read transaction is required to progress through a system. See *Memory types* on page A4-69. |
| ARPROT | Master | Protection attributes of a read transaction: privilege, security level, and access type. See *Access permissions* on page A4-73. |
| ARQOS | Master | Quality of Service identifier for a read transaction. Not implemented in AXI3. See *QoS signaling* on page A8-102. |
| ARREGION | Master | Region indicator for a read transaction. Not implemented in AXI3. See *Multiple region signaling* on page A8-103. |
| ARUSER | Master | User-defined extension for the read address channel. Not implemented in AXI3. See *User-defined signaling* on page A8-104. |
| ARVALID | Master | Indicates that the read address channel signals are valid. See *Channel handshake signals* on page A3-42. |
| ARREADY | Slave | Indicates that a transfer on the read address channel can be accepted. See *Channel handshake signals* on page A3-42. |

FIG 7E

700E
Table of
Read Data Channel Signals

Table A2-6 Read data channel signals

| Signal | Source | Description |
|---|---|---|
| RID | Slave | Identification tag for read data and response. See *ID signals* on page A5-81. |
| RDATA | Slave | Read data. See *Read data channel* on page A3-43. |
| RRESP | Slave | Read response, indicates the status of a read transfer. See *Read and write response structure* on page A3-59. |
| RLAST | Slave | Indicates whether this is the last data transfer in a read transaction. See *Read data channel* on page A3-43. |
| RUSER | Slave | User-defined extension for the read data channel. Not implemented in AXI3. See *User-defined signaling* on page A8-104. |
| RVALID | Slave | Indicates that the read data channel signals are valid. See *Channel handshake signals* on page A3-42. |
| RREADY | Master | Indicates that a transfer on the read data channel can be accepted. See *Channel handshake signals* on page A3-42. |

INTERCONNECTION OF PROTECTED INFORMATION BETWEEN COMPONENTS

TECHNICAL FIELD

Aspects described herein generally relate to interconnects and, more particularly, to interconnects that can integrate any component.

BACKGROUND

Advanced Microcontroller Bus Architecture (AMBA) is an open standard that specifies connection and management of components within a System-on-Chip (SoC). Advanced eXtensible Interface (AXI) is part of the AMBA standard designed to meet interface requirements for a wide range of components, while allowing for flexibility in how those components are interconnected.

There are five independent channels between AMBA AXI master and slave components—write address channel, write data channel, write response channel, read address channel, and read data channel. The address channels are used to send address and control information while performing a basic handshake between master and slave. The data channels are where the information to be exchanged is placed. A master reads data from and writes data to a slave. Read response information is placed on the read data channel. Write response information has a dedicated channel so that the master can verify that a write transaction has been completed. Every exchange of data is called a transaction. A transaction includes the address and control information, the data sent, as well as any response information.

Signals of the AMBA AXI channels from the standard are shown in FIGS. 7A-7E. None of the AMBA AXI channels or signals provide for master-slave communication that is safe enough for functional-safety relevant applications requiring means to detect any fault. The AMBA AXI specification released in 2019 provides end-to-end protection by employing Error Detection and Correction (EDC) schemes within components, and a simple parity scheme for detecting single-bit errors on the AMBA interface between components. Multi-bit errors can be detected only if they occur in different parity signal groups.

The AMBA AXI specification suggests that a source generates parity on the information on an AMBA AXI channel, an interconnect at its input checks this parity and generates an EDC, and the interconnect at its output checks the generated EDC and generates another parity, which is finally checked at the destination. The only sources and destinations that can be integrated are ones that follow this scheme. If the source generates an EDC on some AMBA AXI channels, the AMBA AXI specification provides no indication as to what to do with this EDC information. Also, parity check and EDC generation is at the interconnect input and parity generation and EDC are at the interconnect output, resulting in a complex interconnect design and added system latency. And the specification does not indicate whether the EDC generation at the interconnect input is for each signal, for each channel, or one EDC for multiple channels.

Another challenge is the AMBA AXI standard does not define signal widths. This may result in incompatible master, slave, and interconnect. For example, the master and slave could use different transaction ID signal widths, and thus IP providers tend to provide parity information on such signals.

BRIEF DESCRIPTION OF THE DRAWINGS

FIGS. 7A-7E illustrate channel signal tables from the AMBA AXI specification.

DETAILED DESCRIPTION

The present disclosure provides a low design complexity interconnect which addresses the drawbacks described above in the background section.

Figure 1:
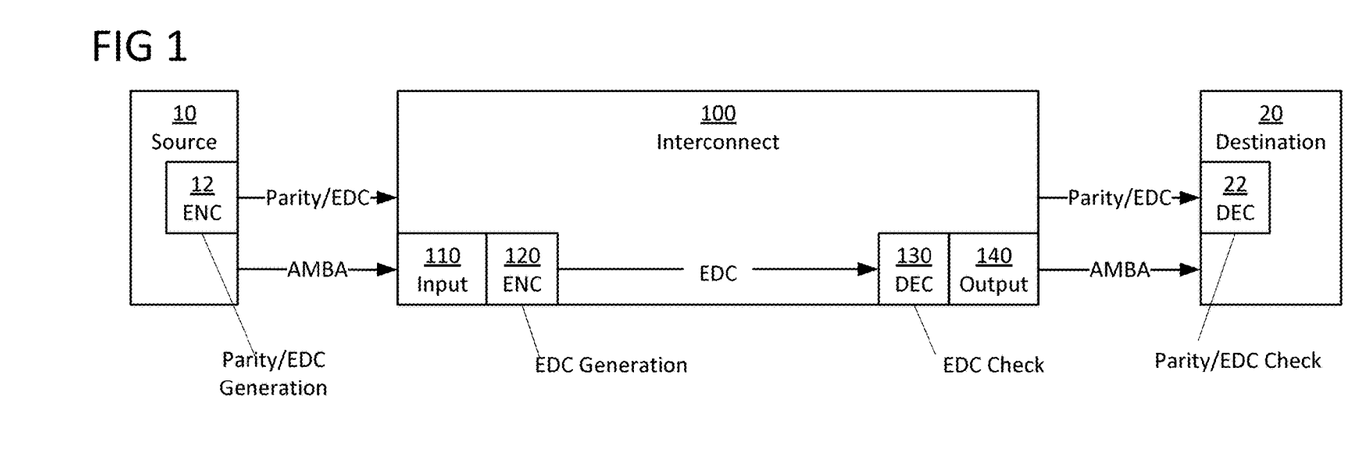
FIG. 1 illustrates an overview of an interconnect in accordance with aspects of the disclosure.

FIG. 1 illustrates an overview of an interconnect 100 in accordance with aspects of the disclosure. The interconnect 100 is shown coupled between a source 10 and a destination 20. The interconnect 100, the source 10, and the destination 20 may be comprised within a System-on-Chip (SoC) of a microcontroller, for example.

The interconnect 100 comprises an input 110, an encoder 120, a decoder 130, and an output 140. The input 110 is couplable to the source 10, which has an encoder 12 configured to generate protection information. The output 140 is couplable to the destination 20, which has a decoder 22 configured to decode the protection information. The protection information may be parity or an Error Detection Code (EDC), for example. It is understood that an EDC when referenced herein may alternatively be an Error Correction Code (ECC) and vice versa, unless stated otherwise. The interconnect 100 is configured to communicate with any source 10 or destination 20 that encodes or decodes signals with parity and/or an EDC.

The source 10 and/or destination 20 may operate in accordance with any AMBA standard such as the AMBA AXI standard, but the disclosure is not limited thereto. The aspects of this disclosure apply to any source and/or destination that does not support secure communication by default.

The interconnect 100 is configured to pass any protection information (e.g., parity or EDC) received from the source 10 directly via a sideband channel to the destination 20. The decoder 22 at the destination 20, rather than a decoder within the interconnect 100, decodes this protection information. If the decoded information at the destination 20 indicates a fault, the destination 20 may raise an alarm for any appropriate action to be taken.

The interconnect encoder 120 uses AMBA information from the source 10 to generate an EDC. More specifically, the encoder 120 first groups information that is received from the source 10 via a same channel. The channel may be any of the AMBA channels, that is, write address channel, write data channel, write response channel, read address channel, or read data channel. The interconnect encoder 120 then sizes the grouped information to a common width by bit-stuffing, and generates the EDC protection based on the sized grouped information. The common width may be based on system configuration. The generated EDC is checked by the interconnect decoder 130 at the output 140 to ensure detection of any faults occurring within the interconnect 100 before the AMBA information is passed to the destination 20. In case of detection of a fault, an alarm may be raised and/or other appropriate action taken. By generating the EDC for the grouped channel information rather than for a single signal of a channel, mixing of signals from different sources 10 is essentially avoided. In other words, if the interconnect encoder 120 were to generate the EDC on only a single signal of a channel (e.g., transaction ID), the risk of the destination 20 receiving a transaction ID from one source and address or other signal from another source due to an interconnect fault is reduced. With existing interconnects the risk of such a fault is significantly higher and would not be detected.

In accordance with a further aspect, the interconnect 100 may be tested by injecting at the interconnect input 110 a signal with an injection error.

Figure 2:
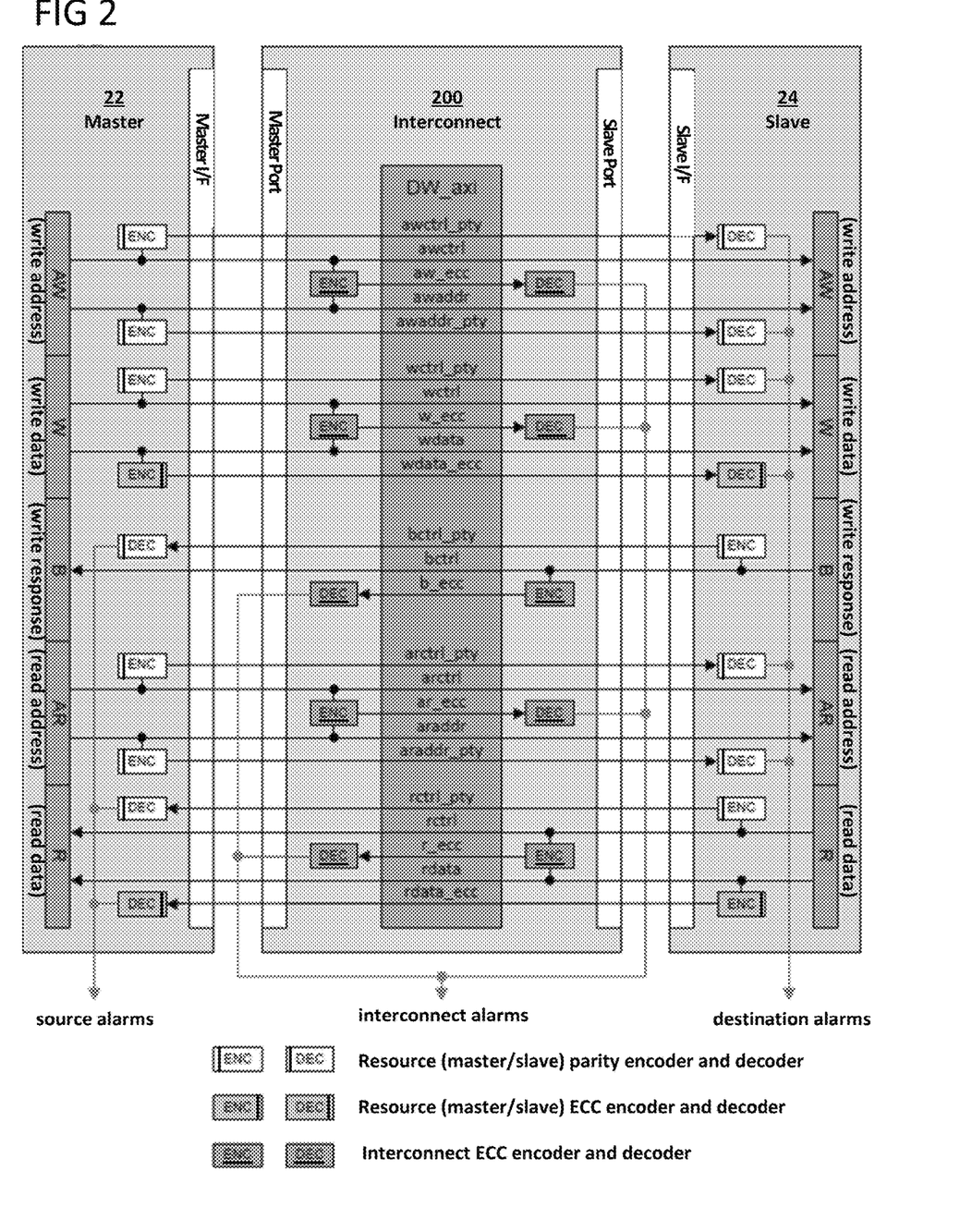
FIG. 2 illustrates an example interconnect in accordance with aspects of the disclosure.

FIG. 2 illustrates an example interconnect 200 in accordance with aspects of the disclosure. The interconnect 200 is coupled between a master 22 (source/destination) and a slave 24 (source/destination).

In the write address channel AW, the master 22 sends parity information towards the slave 24 for both address and control signals (i.e., awaddr_pty for awaddr, and awctrl_pty for awctrl). The parity information is passed directly through the interconnect 200 via a sideband channel, and at the slave 24, the parity information is decoded.

In the write data channel W, the master 22 sends ECC information for the data signal (i.e., wdata_ecc for wdata), but parity information for control signals (i.e., wctrl_pty for wctrl). Both the ECC and the parity are passed through the interconnect 200 and decoded at the slave 24.

In the write response channel B, the slave 24 sends parity information (i.e., bctrl_pty), which passes through the interconnect 200 and is decoded at the master 22.

In the read address channel AR, the master 22 sends parity information (i.e., araddr_pty and arctrl_pty) towards the slave 24 both on address and control signals. This parity information passes through the interconnect 200 and is decoded at the slave 24.

In the read data channel R, the slave 24 sends ECC information for data (i.e., rdata_ecc for rdata) and parity information for control signals (rctrl_pty for rctrl). This ECC and parity information passes through the interconnect 200 and is decoded at the master 22.

The encoders of the interconnect 200 calculate an ECC for each of the channels (i.e., aw_ecc for write address channel AW, w_ecc for write data channel W, b_ecc for write response channel B, ar_ecc for read address channel AR, and r_ecc for read data channel R). The decoders of the interconnect 200 perform ECC checks.

Figure 3:
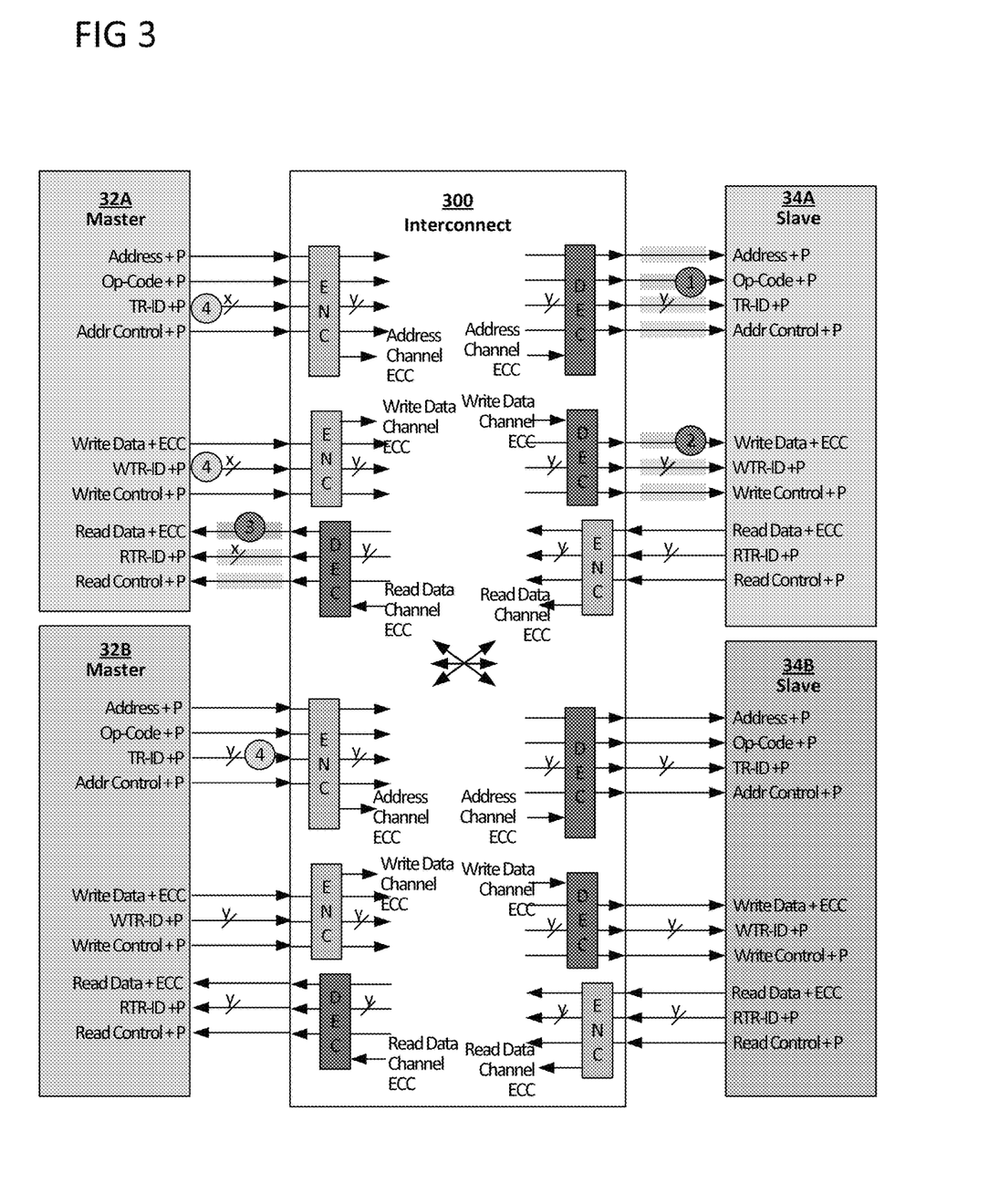
FIG. 3 illustrates an example interconnect coupled between two masters and two slaves to demonstrate how problems with existing interconnects are resolved in accordance with aspects of the disclosure.

FIG. 3 illustrates an example interconnect 300 coupled between two masters 32A and 32B and two slaves 34A and 34B to demonstrate how problems with existing interconnects are resolved in accordance with aspects of the disclosure.

A typical interconnect protocol has a request phase during which a master requests access to a slave. There is an address signal (i.e., Address) for the master to signal the target address for reading/writing, an op-code (i.e., Op-Code) for the master to signal how may data are to be read/written, a transaction ID (i.e., TR-ID) used for access protection to allow the slave to identify which master is sending the request. With AXI, each of the address, op-code, and transaction ID is signaled with a parity (i.e., P), which means the slave cannot check if all of the address, op-code, and transaction ID are coming from the same master. In this situation an error in the interconnect would not be detected.

For example, if a first master requests access to second slave, the second slave receives the correct address, but for some reason the slave receives an op-code from a second master, there is a mix of information. With existing interconnects this mix fault cannot be identified by the slave.

Interconnect 300 illustrates how this mixing problem of the existing interconnects is overcome. The masters and slaves may transmit at different bit widths. In this example master 32 transmits at x-bit width, and master 32B transmits at y-bit width, with the assumption that x is less than y. The interconnect encoders align the transactions from the two masters 32A, 32B to a common width y using bit stuffing. The width y is a system configuration and thus a design choice. References ④ indicate examples where the masters 32A, 32B use different widths for the same parity-protected protocol information transaction ID (i.e., TR-ID). The interconnect encoders adjust the widths to a common bit width via bit stuffing for the ECC encoding and decoding.

The interconnect encoders generate an ECC for information grouped from a same channel (e.g., write data channel). The interconnect decoders detect any erroneous mix of channel information when it performs an ECC check on the received address channel information. This ECC check will detect any failure caused by the interconnect 300, such as the address being from master 32A, and the op-code being from master 32B, or the interconnect 300 inadvertently having scrambled some of the information. The interconnect 300 ensures that all the address information received by slave 34A are coming from the same master (32A or 32B), and a failure within the interconnect is detected. Examples ①, ② and ③ show where an erroneous mix of read data channel information may be detected by the ECC decoders of the interconnect 300, but would not have been detected by existing interconnects. Again, parity signals from the master and slaves are routed directly through the interconnect 300. The parity signals are not required to be covered by the ECC encoders/decoders.

Figure 4:
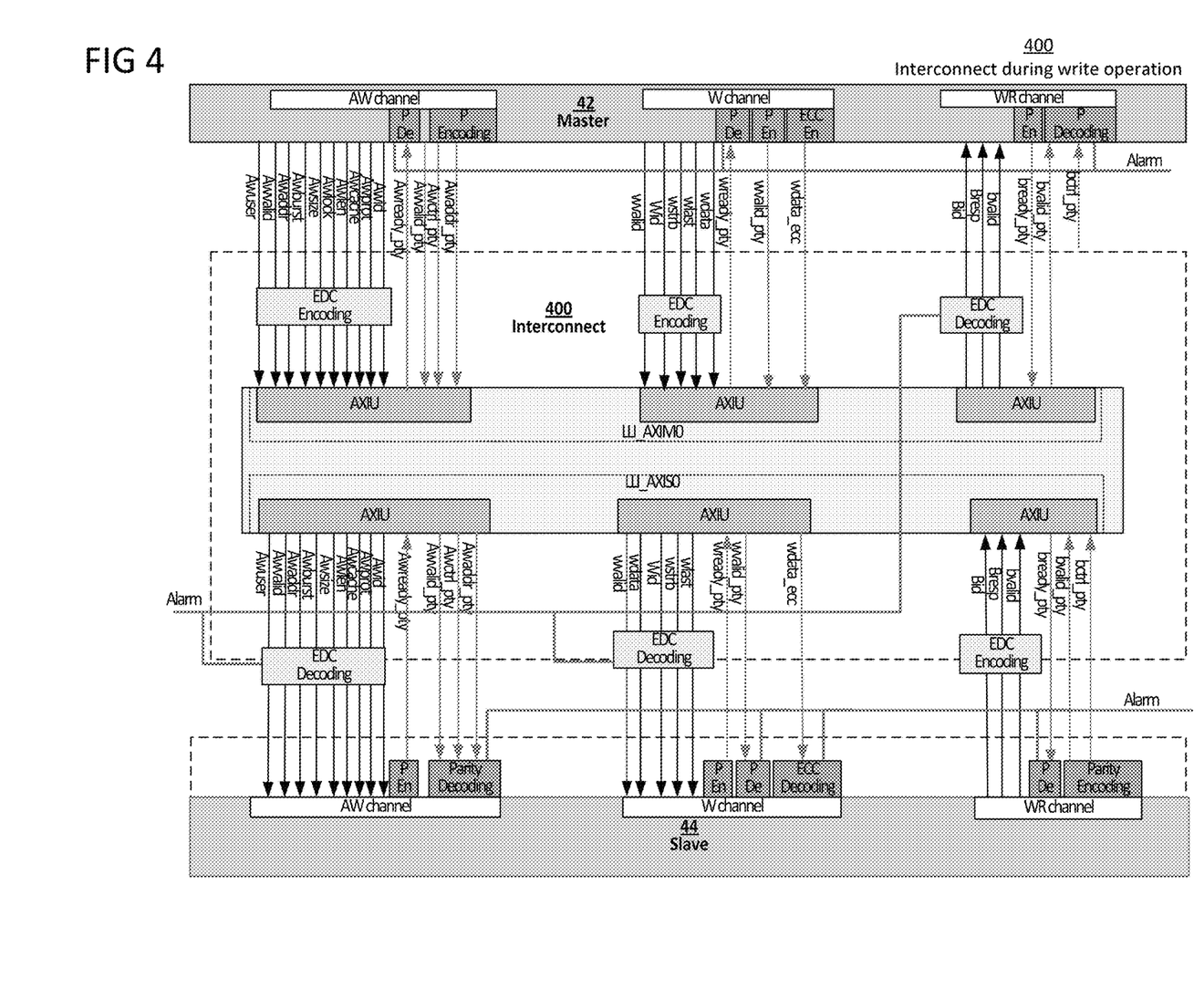
FIG. 4 illustrates an example interconnect during a write operation in accordance with aspects of the disclosure.
Figure 5:
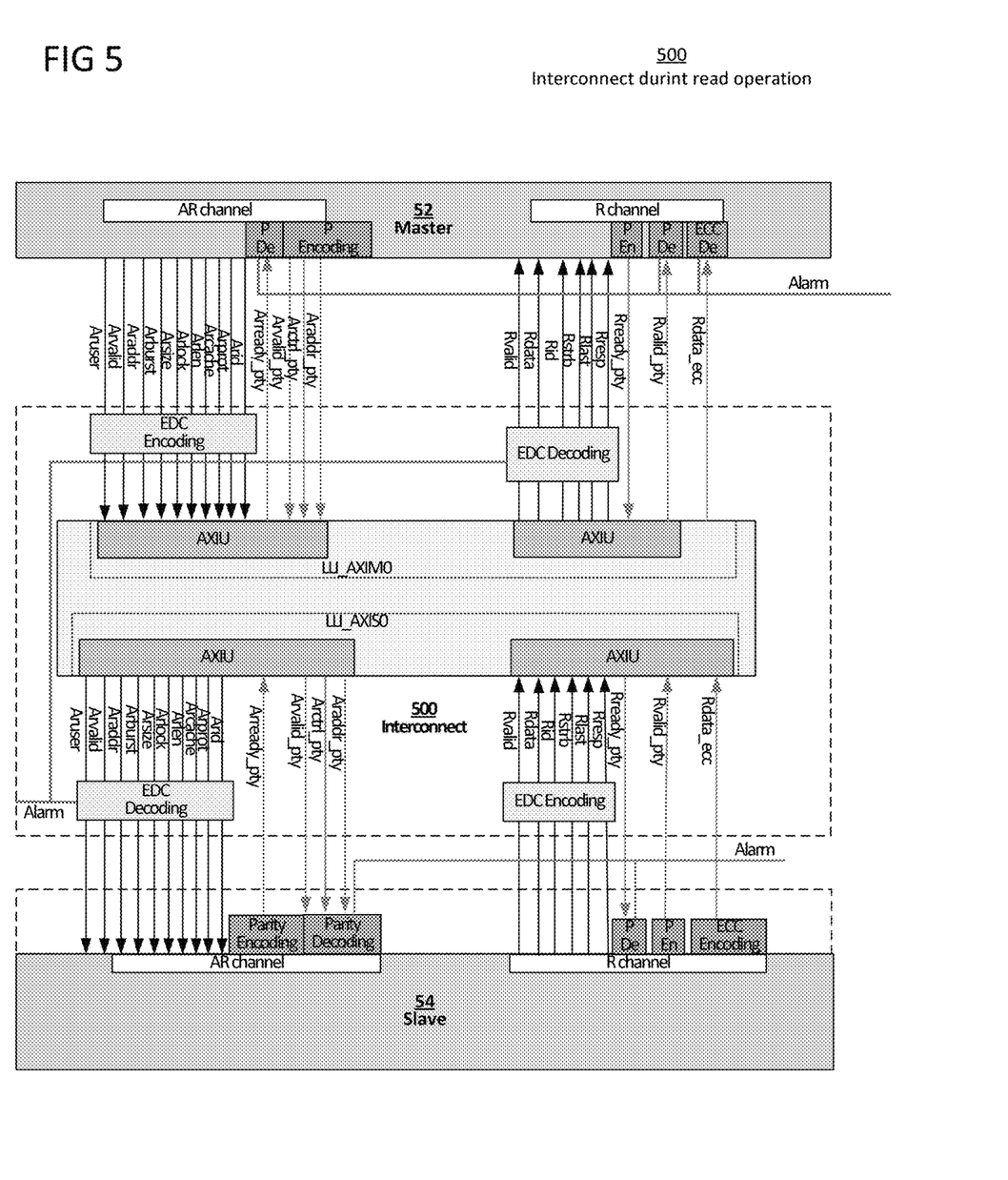
FIG. 5 illustrates an example interconnect during a read operation in accordance with aspects of the disclosure.

FIG. 4 illustrates an example interconnect 400 during a write operation, and FIG. 5 illustrates an example interconnect 500 during a read operation, in accordance with aspects of the disclosure. The signal labels are listed in the tables of FIGS. 7A-7E taken from the AMBA AXI specification. Encoders generate EDCs for each AMBA AXI channel at the input of the interconnect 400/500, and decoders check the EDCs at the output of the interconnect 400/500. Protection information (parity and/or ECC) from the master 42/52 or slave 44/54 is passed to through the interconnect 400/500 to the other of the master 42/52 and slave 44/54 where it is checked. In case of a failure detected at any level of decoding, an alarm may be raised to the system or other appropriate action taken.

Figure 6:
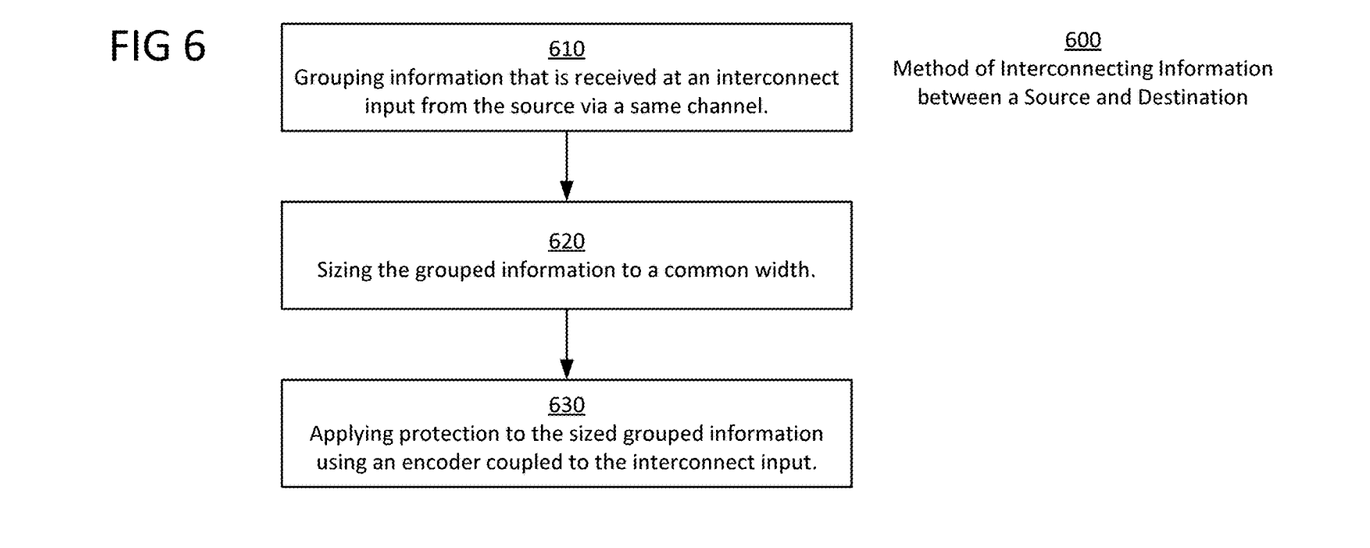
FIG. 6 illustrates a flowchart of a method of interconnecting information between a source and destination in accordance with aspects of the disclosure.

FIG. 6 illustrates a flowchart 600 of a method of interconnecting information between a source 10 and destination 20 in accordance with aspects of the disclosure.

At Step 610, information that is received at an interconnect input 110 from the source 10 via a same channel is grouped.

At Step 620, the grouped information is sized to a common width.

At Step 630, protection is applied to the sized grouped information using an encoder 120 coupled to the interconnect input 110.

Figure 7E:
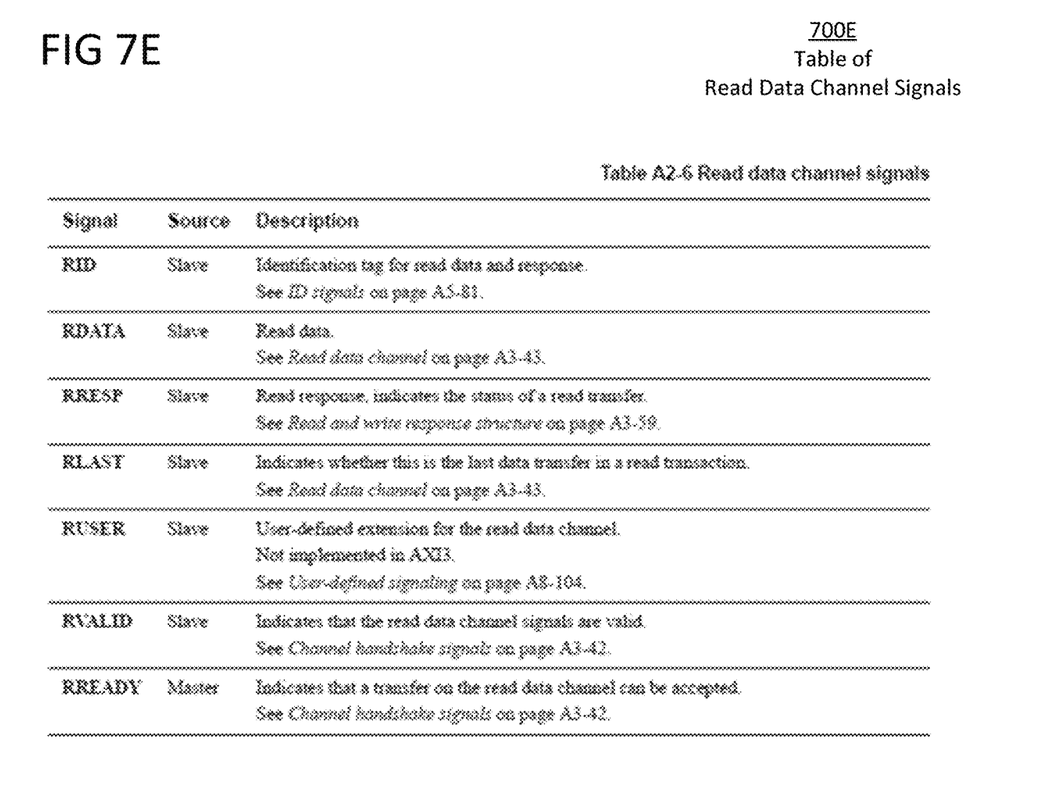

FIGS. 7A-7E illustrate channel signal tables from the AMBA AXI specification. FIG. 7A illustrates table 700A including write address channel signals. FIG. 7B illustrates a table 700B including write data channel signals. FIG. 7C illustrates a table 700C including write response channel signals. FIG. 7D illustrates a table 700D including read address channel signals. FIG. 7E illustrates a table 700E including read data channel signals.

The interconnect disclosed herein is less complex in design and has lower latency as compared with previous interconnects. There is seamless integration of any source, destination, and interconnect communication via the AMBA protocol.

The techniques of this disclosure may also be described in the following examples.

Example 1. An interconnect, comprising: an input couplable to a source; and an encoder coupled to the input, and configured to: group information that is received from the source via a same channel; size the grouped information to a common width; and apply protection to the sized grouped information.

Example 2. The interconnect of example 1, wherein the interconnect is configured to pass any protection information received at the input directly via a sideband signal to an interconnect output.

Example 3. The interconnect of example 2, wherein the received protection information is a parity bit, an error detection code (EDC), or an error correction code (ECC).

Example 4. The interconnect of example 1, further comprising: a decoder coupled to an interconnect output, and configured to perform a check of the protected grouped information.

Example 5. The interconnect of example 4, wherein the decoder is configured to output an alarm signal if the check of the protected grouped information fails.

Example 6. The interconnect of example 1, wherein the protection the encoder is configured to apply to the sized grouped information is an error detection code (EDC) or an error correction code (ECC).

Example 7. The interconnect of example 1, wherein the interconnect is configured to communicate with any source or destination configured in accordance with an Advanced Microcontroller Bus Architecture (AMBA) Advanced eXtensible Interface (AXI) protocol.

Example 8. The interconnect of example 1, wherein the interconnect is configured to receive at the input an injection error for testing the interconnect.

Example 9. The interconnect of example 1, wherein the channel is a write address channel, a write data channel, a write response channel, a read address channel, or a read data channel.

Example 10. The interconnect of example 1, wherein the encoder is configured to size the grouped information to the common width by bit-stuffing.

Example 11. A microcontroller comprising the interconnect of example 1.

Example 12. A method of interconnecting information between a source and destination, the method comprising: grouping information that is received at an interconnect input from the source via a same channel; sizing the grouped information to a common width; and applying protection to the sized grouped information using an encoder coupled to the interconnect input.

Example 13. The method of example 12, further comprising: passing any protection information received at the interconnect input directly via a sideband signal to an interconnect output.

Example 14. The method of example 13, wherein the received protection information is a parity bit, an error detection code (EDC), or an error correction code (ECC).

Example 15. The method of example 12, further comprising: performing a check of the protected grouped information by a decoder coupled to an interconnect output.

Example 16. The method of example 15, further comprising: outputting an alarm signal if the check by the decoder of the protected grouped information fails.

Example 17. The method of example 12, wherein the applying protection to the sized grouped information comprises applying an error detection code (EDC) or an error correction code (ECC).

Example 18. The method of example 12, further comprising: receiving at the interconnect input an injection error for testing the interconnect.

Example 19. The method of example 12, wherein the channel is a write address channel, a write data channel, a write response channel, a read address channel, or a read data channel.

Example 20. The method of claim 12, wherein the sizing the grouped information to the common width comprises bit-stuffing.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. An interconnect, comprising:
an input couplable to a source; and
an encoder coupled to the input, and configured to:
    group information that is received from the source via a same channel;
    size the grouped information to a common width; and
    generate protection for, and apply the protection to, the sized grouped information as a whole.

2. The interconnect of claim 1, wherein the interconnect is configured to pass any protection information received at the input directly via a sideband signal to an interconnect output.

3. The interconnect of claim 2, wherein the received protection information is a parity bit, an error detection code (EDC), or an error correction code (ECC).

4. The interconnect of claim 1, further comprising:
a decoder coupled to an interconnect output, and configured to perform a check of the protected grouped information.

5. The interconnect of claim 4, wherein the decoder is configured to output an alarm signal if the check of the protected grouped information fails.

6. The interconnect of claim 1, wherein the protection the encoder is configured to apply to the sized grouped information is an error detection code (EDC) or an error correction code (ECC).

7. The interconnect of claim 1, wherein the interconnect is configured to communicate with any source or destination configured in accordance with an Advanced Microcontroller Bus Architecture (AMBA) Advanced extensible Interface (AXI) protocol.

8. The interconnect of claim 1, wherein the interconnect is configured to receive at the input an injection error for testing the interconnect.

9. The interconnect of claim 1, wherein the channel is a write address channel, a write data channel, a write response channel, a read address channel, or a read data channel.

10. The interconnect of claim 1, wherein the encoder is configured to size the grouped information to the common width by bit-stuffing.

11. A microcontroller comprising the interconnect of claim 1.

12. A method of interconnecting information between a source and destination, the method comprising:
- grouping information that is received at an interconnect input from the source via a same channel;
- sizing the grouped information to a common width; and
- generating protection for, and applying the protection to, the sized grouped information as a whole using an encoder coupled to the interconnect input.

13. The method of claim 12, further comprising:
- passing any protection information received at the interconnect input directly via a sideband signal to an interconnect output.

14. The method of claim 13, wherein the received protection information is a parity bit, an error detection code (EDC), or an error correction code (ECC).

15. The method of claim 12, further comprising:
- performing a check of the protected grouped information by a decoder coupled to an interconnect output.

16. The method of claim 15, further comprising:
- outputting an alarm signal if the check by the decoder of the protected grouped information fails.

17. The method of claim 12, wherein the applying protection to the sized grouped information comprises applying an error detection code (EDC) or an error correction code (ECC).

18. The method of claim 12, further comprising:
- receiving at the interconnect input an injection error for testing the interconnect.

19. The method of claim 12, wherein the channel is a write address channel, a write data channel, a write response channel, a read address channel, or a read data channel.

20. The method of claim 12, wherein the sizing the grouped information to the common width comprises bit-stuffing.

* * * * *